A. SCHAEFER.
VEGETABLE SLICING MACHINE.
APPLICATION FILED MAR. 9, 1918.
1,265,527.
Patented May 7, 1918.
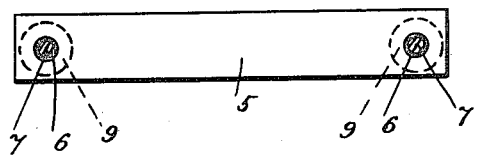
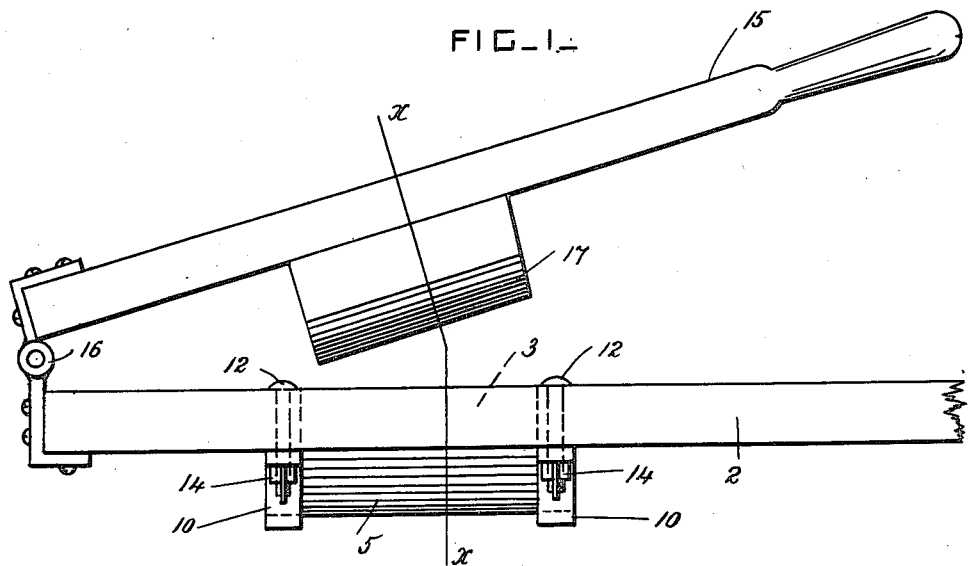
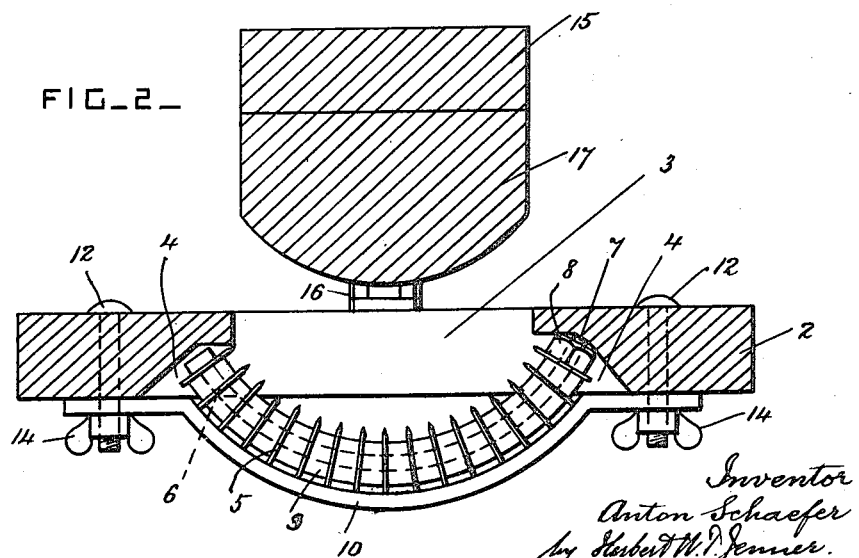
Inventor
Anton Schaefer
by Herbert W. T. Jenner.
Attorney.

UNITED STATES PATENT OFFICE.

ANTON SCHAEFER, OF SPRING GROVE, ILLINOIS.

VEGETABLE-SLICING MACHINE.

1,265,527.　　　　　　Specification of Letters Patent.　　Patented May 7, 1918.

Application filed March 9, 1918. Serial No. 221,436.

*To all whom it may concern:*

Be it known that I, ANTON SCHAEFER, a citizen of the United States, residing at Spring Grove, in the county of McHenry and State of Illinois, have invented certain new and useful Improvements in Vegetable-Slicing Machines, of which the following is a specification.

This invention relates to machines for cutting vegetables into slices, and it may also be used for fruit and other similar articles; and it consists in the novel construction and combination of the parts hereinafter fully described and claimed.

In the drawings, Figure 1 is a side view of a slicing machine constructed according to this invention. Fig. 2 is a cross-section through the machine, taken on the line $x$—$x$ in Fig. 1. Fig. 3 is a detail view of one of the knife blades.

A suitable support 2 is provided, and it may be the top of a table or a board which may be secured to a table. This support has a rectangular hole 3 in it, and two recesses 4 are cut in the underside of the support at opposite sides of the hole.

A series of knife blades 5 is provided, and these blades are straight and flat, and have holes 6 in each end portion. These blades are assembled or secured together, so as to make a segment of a cylinder, by means of two curved bolts 7, which are passed through the holes 6 and which are provided with removable nuts 8. Spacing washers or plates 9 are interposed between the end portions of the blades, and are preferably strung upon the bolts 7, and these washers are tapered a little to permit the blades to be secured upon a circular arc.

The nuts and heads of the bolts 7 are secured in engagement with the recesses 4, so that the knife blades cannot slip from their position under the hole 3. Curved bars 10 are provided for holding the knife blades in position. These curved bars bear against the end portions of the blades, and they are clamped to the support 2 by bolts 12 having thumb-nuts 14. This enables the blades to be removed and replaced with facility, and the individual knives or blades can then be separated from each other, for the purpose of sharpening them or cleaning them, by removing the nuts from the bolts 7.

A pressing lever 15 is provided and is connected at one end with the support 2 by any suitable pivot or hinge 16. The middle part of the lever is provided with a pressing block 17 which enters the hole 3 when the lever is depressed. The face of this block is suitably curved, and it forces the vegetables or fruit against the sharp edges of the knives. The slices formed by the knives fall between them and are caught in any suitable receptacle.

What I claim is:

1. A slicing machine, comprising a stationary support provided with a hole, a series of spaced knife blades secured together and arranged in the form of a segment of a cylinder, curved clamping bars provided with fastening devices and engaging with the end portions of the blades and detachably supporting them under the said hole, and means for forcing the articles to be sliced against the edges of the knife blades.

2. A slicing machine, comprising a stationary support provided with a hole and having recesses in its underside at opposite sides of the hole, a series of spaced knife blades secured together and arranged in the form of a segment of a cylinder with its ends engaging with the said recesses, curved clamping bars provided with fastening devices and engaging with the end portions of the blades and detachably supporting them under the said hole, and means for forcing the articles to be sliced against the edges of the knife blades.

In testimony whereof I have affixed my signature.

ANTON SCHAEFER.